United States Patent [19]

Vogel

[11] Patent Number: 5,212,867
[45] Date of Patent: May 25, 1993

[54] METHOD AND UNIT FOR FILLING ELECTROCHEMICAL CELLS

[75] Inventor: Karl-Wilhelm Vogel, Willingen, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 518,559

[22] Filed: Dec. 1, 1989

[30] Foreign Application Priority Data

Apr. 19, 1989 [DE] Fed. Rep. of Germany ....... 3912846

[51] Int. Cl.⁵ ............................................. H01M 2/36
[52] U.S. Cl. .................................. 29/623.1; 141/192; 429/64
[58] Field of Search ................ 29/623.1, 730; 429/61, 429/63, 64; 222/52; 141/192

[56] References Cited

U.S. PATENT DOCUMENTS

| | | | |
|---|---|---|---|
| 3,434,887 | 3/1969 | Seckinger | 141/192 X |
| 3,748,186 | 7/1973 | Rosansky et al. | 29/623.2 |
| 4,529,020 | 7/1985 | Hoover et al. | 29/623.1 X |

FOREIGN PATENT DOCUMENTS

| | | |
|---|---|---|
| 2541148 | 3/1977 | Fed. Rep. of Germany . |
| 3439942 | 5/1985 | Fed. Rep. of Germany . |
| 3744606 | 7/1989 | Fed. Rep. of Germany . |
| 3826423 | 3/1990 | Fed. Rep. of Germany . |

OTHER PUBLICATIONS

Thomas M. Watson; Manufacturing Techniques for Hermetically Sealed Lithium Organic Electrolyte Cells; pp. 192-195 (date unknown).
Ralph E. White, J. O'M. Bockris and B. E. Conway; Modern Aspects of Electrochemistry; pp. 215-216 (date unknown).
David Linden; Handbook of Batteries and Fuel Cells; "Reserve And Special Batteries" (date unknown).
Robert W. Brown; Lithium-Thionyl Chloride Pressure Activated Reserve Battery (Parb); 11-14 Jun. 1984; pp. 460-465.
U. Zak and G. Yariv; Lithium Thionyl Chloride, High--Rate, Reserve Battery; pp. 453-459 (date unknown).
Notification of Presentation; Aug. 1986.
Bundesamt f',uml/u/ r Wehrtechnik und Beschaffung; Presentation of test results; Sep. 20, 1988.
Dr. Günter Eichinger and Dr. Günter Semrau; Studie über Realisiebarkeitsnachweis Lithium-Thionylchlorid Torpedobatterie Für Torpedo DM 2 A 4; Final Report of Jul. 1985 to Feb. 1988.

*Primary Examiner*—Stephen Kalafut
*Attorney, Agent, or Firm*—Robert W. Becker & Associates

[57] ABSTRACT

A method and unit for filling electrochemical cells, especially lithium cells, with an electrolyte. The cells are first evacuated while simultaneously checking the same for short circuits. The further filling process is terminated for any cell determined to have a short circuit. After the final vacuum level has been achieved, the cells are subsequently filled with the electrolyte while simultaneously monitoring the electrical voltage at the cells. The filling process is terminated for any cell determined to have a deviation from a prescribed voltage.

5 Claims, 2 Drawing Sheets

METHOD AND UNIT FOR FILLING ELECTROCHEMICAL CELLS

BACKGROUND OF THE INVENTION

The present invention relates to a method of filling electrochemical cells, especially high-power cells and in particular lithium cells, with an electrolyte; the present invention also relates to a unit for carrying out this method.

Electrochemical cells basically comprise electrodes and an electrolyte. In order to place such electrochemical cells in an operational state, the liquid electrolyte is filled into the cell housing, in which are disposed the electrodes.

Up to now, this filling process has been carried out to manually controlled filling levels. During the filling process, however, defective cells are not recognized, which can lead to a considerable safety risk since if a short circuit occurs between the electrodes of the cells, or if the voltage deviates from prescribed theoretical values, explosions can occur in such defective cells.

It is therefore an object of the present invention to provide a method and unit for filling electrochemical cells of the aforementioned general type with an electrolyte, with such a method and unit being able to eliminate the risks for operating personnel and to the apparatus as a result of defective cells.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
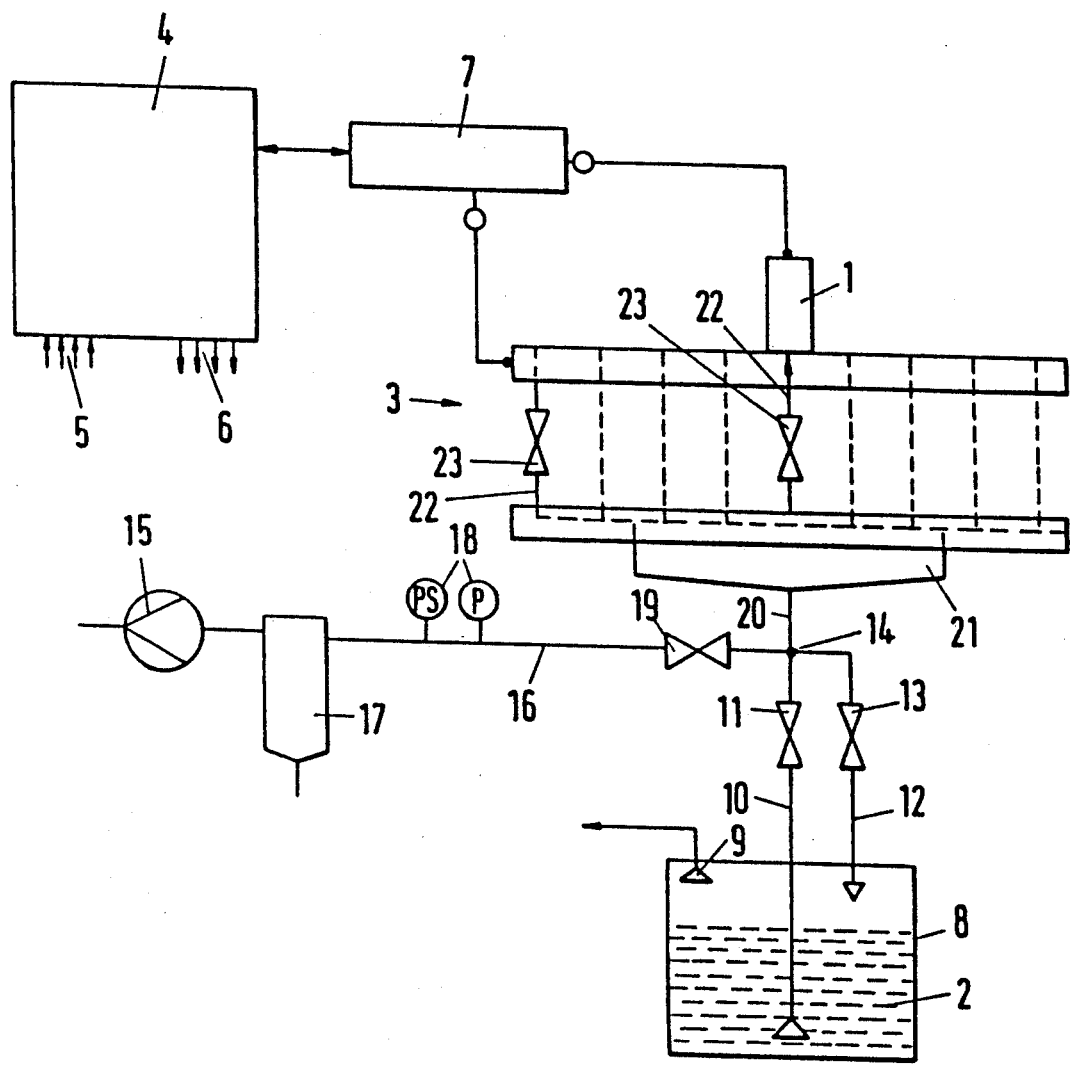
FIG. 1 is a schematic illustration of one exemplary embodiment of the inventive unit for filling electrochemical cells.

The method of the present invention is characterized primarily by the steps of: first evacuating the cells and simultaneously checking the same for short circuits, whereby for any cell determined to have a short circuit, the further filling process is terminated: and after the final vacuum level has been achieved in the cells, subsequently filling the same with the electrolyte while simultaneously monitoring the electrical voltage at the cells, whereby for any cell determined to have a deviation from a prescribed voltage range, the filling process is terminated.

By means of such a method of filling electrochemical cells, it is possible to have a fully automatic monitoring of the cells during the filling process, whereby as a result of the inventive control, the risks for operating personnel and to the apparatus as a result o±defective cells can be eliminated The inventive method thus enables a reliable control, especially of high-power cells, during the filling process, whereby the method automatically recognizes and singles out cells that represent safety risks and that show defects in quality. By generating a vacuum within the interior of the cells at the beginning of the filling process, above all the physical basis for filling the cells is provided in that these cells will fill themselves with the electrolyte as a consequence of the partial vacuum.

Pursuant to a further development of the inventive method, to simultaneously fill several cells it is proposed that each of the cells be connected to a supply line, which is provided with a cell valve, not only for the evacuation but also for the filling with the electrolyte; if a short circuit or a deviation in voltage is encountered in a particular cell, the corresponding cell valve is closed. This has the advantage that when a defect is encountered in a particular cell, it is necessary to close only the corresponding cell valve in order to disconnect this cell from the further filling process. The rest of the cells can then be filled pursuant to the prescribed process without being affected by the defective cell and without the necessity for having to shut down the entire unit in order to single out the defective cell.

When a defect is encountered in a cell, the disruption is preferably fed to a visual and/or audible indicator mechanism, with the latter being, for example, in the form of a horn or buzzer. The operating personnel can consequently immediately recognize that one of the cells is defective.

Pursuant to a further development of the inventive filling process, a particular filling time is preferably prescribed for filling the cells with the electrolyte.

Finally, pursuant to a further development of the inventive method, it is proposed that a defective cell be automatically subjected to a removal process.

The unit for carrying out the method of the present invention is characterized primarily by: a control mechanism for the unit; an electronic measuring mechanism connected to the control mechanism and to the cells for checking the cells for short circuits and for monitoring the voltage of the cells; an electrolyte tank for the electrolyte; a vacuum pump; first supply line means leading from the electrolyte tank to the cells; second supply line means leading from the vacuum pump to the cells; first valve means (a filling valve) disposed in the first supply line; and second valve means (a vacuum valve) disposed in the second supply line. This inventive unit represents a technically straightforward approach for being able to automatically carry out the inventive filling process.

Pursuant to one specific embodiment of the inventive unit, a condensate trap is disposed upstream of the vacuum pump.

Finally, pursuant to a preferred further development of the inventive unit, for simultaneously filling several cells, it is proposed that the supply lines that lead from the electrolyte tank and from the vacuum pump open out in a distributor, from where respective cell supply lines lead to the individual cells, with each of these cell supply lines having disposed therein a cell valve. These cell supply lines and the cell valves have the advantage that by closing the cell valve of a defective cell, this cell can be disconnected from the further filling process without having to shut down the entire unit.

Further specific features of the present invention will be described in detail subsequently.

DESCRIPTION OF PREFERRED EMBODIMENTS

Referring now to the drawings in detail, the unit illustrated in FIG. 1 serves for the filling of electrochemical cells 1, especially lithium cells, with an electrolyte 2. For this purpose, the cells 1 are disposed next to one another in a distribution station 3; for the sake of simplicity, only a single cell 1 is illustrated in FIG. 1.

For controlling the unit, a control mechanism (SPS) 4 is provided that has appropriate inputs 5 and outputs 6. This control mechanism 4 for the unit is connected with an electronic measuring mechanism 7 that in turn is connected with the electrodes of the cells 1, so that it is possible therewith to undertake a check for short circuits as well as to monitor voltage during the filling process.

The unit is furthermore provided with an electrolyte tank 8 for accommodating the electrolyte 2. This electrolyte tank 8 is provided with vent means 9. In addition, leading from the electrolyte tank 8 is a supply line 10 in which is disposed a filling valve 11. Opening into the electrolyte tank is a discharge line 12 in which is disposed an appropriate discharge valve 13. This discharge line 12 starts from a junction 14 in the supply line 10.

Finally, the unit is also provided with a vacuum pump 15 to evacuate the cells 1. The vacuum pump 15 is connected to the junction 14 via a line 16; disposed ahead of the vacuum pump 15 are a condensate trap 17, vacuum switch means 18, and a valve 19.

At the junction 14, the supply line 10 from the electrolyte tank 8 and the line 16 from the vacuum pump 15 merge into a common supply line 20 that opens into a distributor means 21. Proceeding from this distributor means 21 are cell supply lines 22 that lead to the cells 1 and in each of which is disposed a respective cell valve 23.

Figure 2:
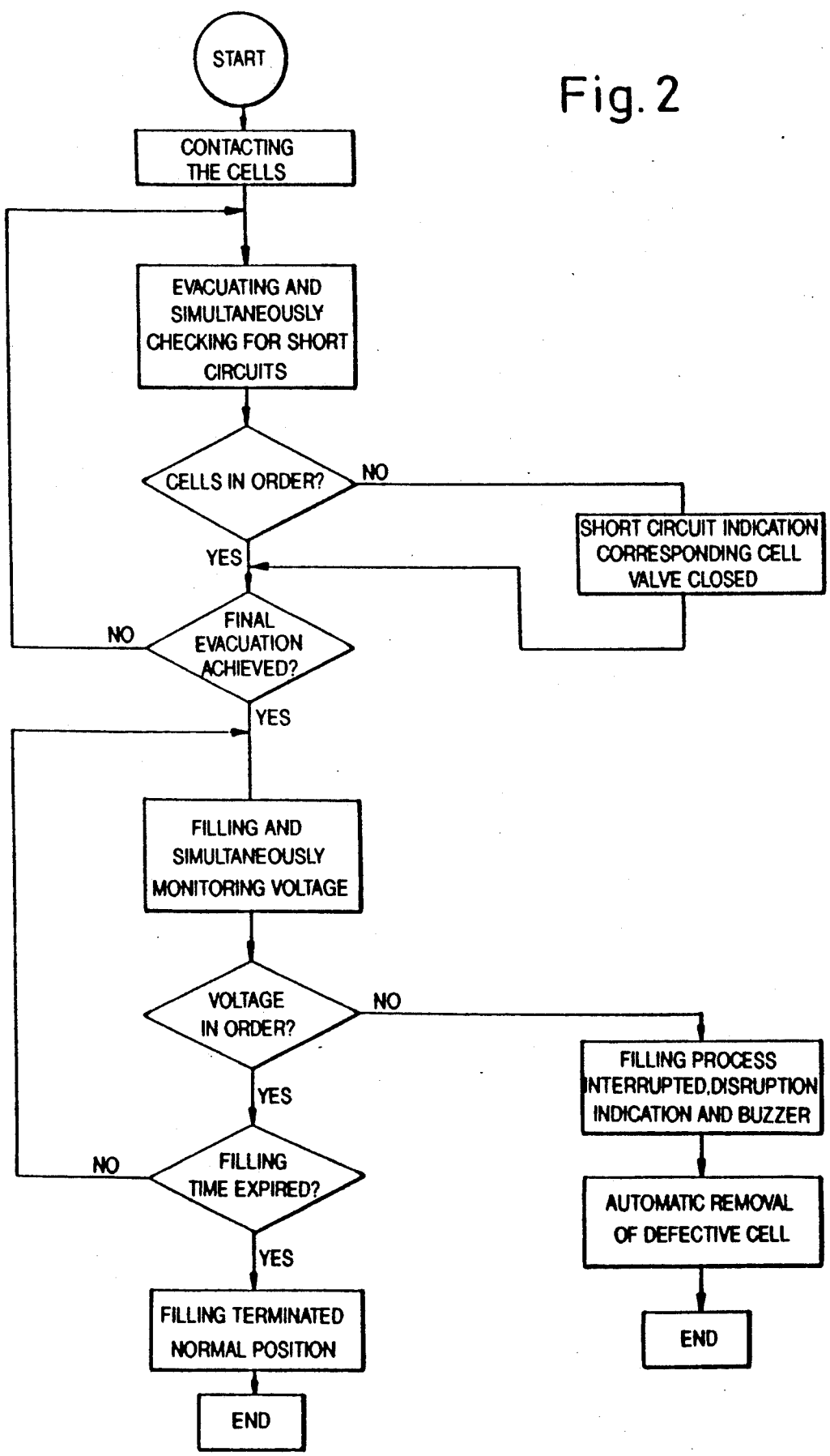
FIG. 2 is a block diagram illustrating the operational sequence pursuant to one prescribed cycle for controlling the filling unit of FIG. 1.

The procedure for filling the cells 1 will be explained subsequently in conjunction with FIG. 2.

To begin with, the distribution station 3 of the filling unit is provided with the electrochemical cells 1. In so doing, the electrolyte supply openings in the cells 1 are connected with the cell supply lines 22.

The actual filling process can then be started with a push button. The electrical lines are first automatically contacted; in other words, the terminals or end poles of the cells 1 are connected with the electronic measuring mechanism 7. The cells 1 are thereupon evacuated by starting the vacuum pump 15 and opening the valve 19 as well as the cell valves 23. By generating a vacuum within the cells the physical basis for the filling operation is provided in that the cells 1, as a result of the partial vacuum, fill themselves with the electrolyte via suction. In this connection, the rate of filling of the cells 1 can be affected by the pressure differential between the cells and the electrolyte tank 8. The filling valve 11 and the discharge valve 13 are closed during this procedure. Effected at the same time as the evacuation is a checking of the cells 1 for a short circuit via the electronic measuring mechanism 7. This mechanism 7 monitors whether the cells 1 are in order, i.e. whether or not there is a short circuit in the cells. If the cells 1 are in order, they are evacuated until the final vacuum is achieved.

However, if one of the cells 1 is not in order, for example if a short circuit exists in this cell, an appropriate short-circuit indicator is actuated and above all the corresponding cell valve 23 is closed. This cell 1 is thus disconnected from the further filling process, in other words from the further evacuation and above all from the subsequent filling with the electrolyte 2. The non-defective cells 1 continue to carry out the prescribed cycle without being affected by the defective cell 1.

After the intact cells 1 have achieved their final vacuum, the vacuum valve 19 is closed. Subsequently, by opening the filling valve 11 the process of filling the cells 1 with the electrolyte 2 is started, whereby simultaneous with the filling, the electrical voltage present at the cells 1 is monitored by the electronic measuring mechanism 7. As long as the voltage is in a prescribed theoretical range, the filling process is maintained until a prescribed filling time has expired, after which the cells 1 are completely filled.

However, if as a result of the voltage monitoring it is determined that the voltage in one of the cells 1 has deviated from the theoretical value, which is an indication that a defect exists in this cell, the process is immediately terminated by closing the corresponding cell valve 23 and is indicated by a disruption indication as well as by a horn or buzzer, so that subsequently an automatic removal of this defective cell 1 can be undertaken.

As a result of this fully automatic procedure, a reliable control of the cells 1 during the filling process is assured, with the automatic monitoring recognizing and singling out those cells that are safety risks and have defects in quality.

The present invention is, of course, in no way restricted to the specific disclosure of the specification and drawings, but also encompasses any modifications within the scope of the appended claims.

What I claim is:

1. A method of filling electrochemical cells, with an electrolyte, including the steps of:
   first evacuating said cells and simultaneously checking same for short circuits, whereby for any cell determined to have a short circuit, the further filling process is terminated; and
   after the final vacuum level has been achieved in said cells, subsequently filling same with said electrolyte while simultaneously monitoring the electrical voltage at said cells, whereby for any cell determined to have a deviation from a prescribed voltage range, the filling process is terminated.

2. A method according to claim 1 for simultaneously filling several of said cells, including the steps of connecting each of said cells to a cell supply line which is provided with a cell valve and serves for said evacuation and said filling of said cells with said electrolyte, and closing the corresponding cell valve upon determination of a short circuit or voltage deviation in one of said cells.

3. A method according to claim 2 which includes the step, upon determination of a defect in one of said cells, of feeding said disruption to a visual and/or audible indicator means.

4. A method according to claim 2, which includes the step of prescribing a specific filling time for said filling of said cells with said electrolyte.

5. A method according to claim 2, which includes the step, upon determination of a defect in one of said cells, of subjecting this cell to a removal process.

* * * * *